(12) United States Patent
Ashby et al.

(10) Patent No.: US 11,965,073 B2
(45) Date of Patent: *Apr. 23, 2024

(54) POLYESTER FILM COMPRISING A POLYMERIC PHOSPHONATE FLAME RETARDANT

(71) Applicant: DuPont Teijin Films U.S. Limited Partnership, Wilmington, DE (US)

(72) Inventors: Shane Ashby, Wilton (GB); Simon Mortlock, Dumfries (GB); William A. MacDonald, Wilton (GB); Allan Lovatt, Wilton (GB)

(73) Assignee: DuPont Teijin Films U.S. Limited Partnership, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/180,436

(22) Filed: Mar. 8, 2023

(65) Prior Publication Data

US 2023/0257538 A1 Aug. 17, 2023

Related U.S. Application Data

(63) Continuation of application No. 17/050,830, filed as application No. PCT/GB2019/051165 on Apr. 26, 2019, now Pat. No. 11,634,548.

(30) Foreign Application Priority Data

Apr. 27, 2018 (GB) ..................... 1806916

(51) Int. Cl.
*C08J 5/18* (2006.01)
*C08J 7/043* (2020.01)
*C08J 7/052* (2020.01)
*C08K 5/5357* (2006.01)
*C08L 67/02* (2006.01)

(52) U.S. Cl.
CPC ............... *C08J 5/18* (2013.01); *C08J 7/043* (2020.01); *C08J 7/052* (2020.01); *C08K 5/5357* (2013.01); *C08L 67/02* (2013.01); *C08J 2333/04* (2013.01); *C08J 2367/02* (2013.01); *C08L 2201/02* (2013.01)

(58) Field of Classification Search
CPC ... C08J 5/18; C08J 7/052; C08J 7/043; C08K 5/5357; C08L 67/02
See application file for complete search history.

(56) References Cited

U.S. PATENT DOCUMENTS

| 5,256,714 A | 10/1993 | Liu et al. |
| 6,326,431 B1 | 12/2001 | Peiffer et al. |
| 6,730,406 B2 | 5/2004 | Murschall et al. |
| 6,872,461 B2 | 3/2005 | Murschall et al. |
| 6,881,470 B2 | 4/2005 | Murschall et al. |
| 7,189,451 B2 | 3/2007 | Kiehne et al. |
| 2001/0018476 A1 | 8/2001 | Murschall et al. |
| 2001/0029274 A1 | 10/2001 | Murschall et al. |
| 2003/0004237 A1 | 1/2003 | Murschall et al. |
| 2003/0012937 A1 | 1/2003 | Murschall et al. |
| 2003/0032704 A1 | 2/2003 | Murschall et al. |
| 2003/0054129 A1 | 3/2003 | Murschall et al. |
| 2014/0000751 A1 | 1/2014 | Kagumba et al. |
| 2014/0053901 A1 | 2/2014 | Brennan et al. |
| 2015/0197875 A1 | 7/2015 | Kim et al. |
| 2015/0338563 A1 | 11/2015 | Kiuchi et al. |
| 2016/0168760 A1 | 6/2016 | Lebel et al. |
| 2018/0002501 A1 | 1/2018 | Liao et al. |
| 2021/0047500 A1 | 2/2021 | Ashby et al. |

FOREIGN PATENT DOCUMENTS

| DE | 10002157 A1 | 7/2001 |
| DE | 10007729 A1 | 8/2001 |
| DE | 10030237 A1 | 1/2002 |
| DE | 10035327 A1 | 1/2002 |
| DE | 10043779 A1 | 3/2002 |
| JP | H01-144453 A | 6/1989 |
| JP | H06-200131 A | 7/1994 |
| JP | 2004-131669 A | 4/2004 |
| JP | 2004-217784 A | 8/2004 |
| JP | 2006-274112 A | 10/2006 |
| JP | 2009-155478 A | 7/2009 |
| KR | 101234613 B1 | 2/2013 |
| WO | WO 2010/080491 A1 | 7/2010 |
| WO | WO 2011/116906 A1 | 9/2011 |
| WO | WO 2012/120260 A1 | 9/2012 |
| WO | WO 2014/005136 A1 | 1/2015 |
| WO | WO 2019/079324 A1 | 4/2019 |

OTHER PUBLICATIONS

GB 1806916.1, Dec. 20, 2018, Search Report under Section 17(5).
PCT/GB2019/051165, Jun. 26, 2019, International Search Report and Written Opinion.
PCT/GB2019/051165, Jul. 7, 2020, International Preliminary Report on Patentability.
Search Report under Section 17(5) for GB Application No. 1806916.1 dated Dec. 20, 2018.
International Search Report and Written Opinion for International App. No. PCT/GB2019/051165 dated Jun. 26, 2019.
International Preliminary Report on Patentability for International App. No. PCT/GB2019/051165 dated Jul. 7, 2020.
Cai et al., Packaging Technical Manual. Japanese Packaging Technology Association. Mechanical Industry Press. May 1994:7 pages.

*Primary Examiner* — John E Uselding
(74) *Attorney, Agent, or Firm* — Wolf, Greenfield & Sacks, P.C.

(57) ABSTRACT

A polyester film comprising a polymeric phosphonate flame retardant in an amount of from about 1.0 to about 25.0 wt % by total weight of the film and further comprising at least one metal cation selected from the group consisting of Group I and Group II metal cations.

24 Claims, No Drawings

POLYESTER FILM COMPRISING A POLYMERIC PHOSPHONATE FLAME RETARDANT

CROSS-REFERENCE TO RELATED APPLICATIONS

This application is a continuation of U.S. application Ser. No. 17/050,830, filed Oct. 26, 2020, which is a U.S. National Stage patent application based on International Patent Application Serial No. PCT/GB2019/051165, filed Apr. 26, 2019, which claims the benefit of United Kingdom Application No. GB 1806916.1, filed Apr. 27, 2018, each of which is hereby incorporated herein by reference in its entirety.

The present invention relates to flame retardant polyester film, as well as a method of making the film and uses thereof.

The advantageous mechanical properties, dimensional stability and optical properties of polyester films are well-known. However, most polymeric materials used in construction, textiles, furnishing and electrical applications are flammable. There is a strong desire to decrease the combustibility of materials and to render the materials safer in use. The most common approach is to add one or more flame retardant elements to the flammable polymer system but in turn these can cause other problems. For instance, it has proven difficult to achieve high enough loadings without adversely affecting subsequent processing and/or the physical properties of the polymer composition or polymer film. In particular, it has been difficult to provide flame retardant polyester films which exhibit advantageous optical properties (such as high clarity) and/or low shrinkage. In addition, it has also been difficult to provide flame retardant polyester films without loss of crystallinity, which can in turn adversely affect the mechanical properties of the film.

It is an object of the invention to solve one or more of the afore-mentioned problems, in particular to provide a polyester film which exhibits excellent flame retardancy without detriment to the optical properties of the film, particularly without an unacceptable reduction in clarity and/or transparency. It is a particular object of the present invention to provide a polyester film which exhibits excellent flame retardancy and excellent optical properties, particularly high clarity and high transparency of the film, for instance as measured by haze and TLT.

DE-10043779-A describes a biaxially oriented multi-layered film suitable for displays and protective glazing, wherein the film comprises a base layer of bi-benzene-modified thermoplastic polymer and a covering layer. The covering layer comprises a mixture, or blend, of two components. The first component may be polyethylene terephthalate (PET) and the second component may be mixture, or blend, of a copolymer derived from isophthalic acid, a sulfomonomer, an aliphatic or cycloaliphatic glycol and optionally an aliphatic dicarboxylic acid. The film may optionally comprise a flame retardant such as dimethyl methylphosphonate.

DE-10035327-A describes an opaque biaxially oriented polyester film comprising at least one layer containing 2 to 60 wt % of a cycloolefin copolymer and at least one adhesion-promoted surface including a flame retardant. The flame retardant may be an organic phosphorus compound such as dimethyl methyl phosphonate.

JP-2004131669-A describes a biaxially oriented polymer film for magnetic recording media, wherein the film contains a polyester and a polymer containing a phosphonic acid residue and a dihydric phenol residue, which is reported to provide excellent rigidity and toughness.

JP-2006274112-A describes a biaxially oriented polyester film for magnetic recording media which exhibits excellent dimensional stability. The film comprises an enthalpy relaxation promotion agent, which can be a metal salt such as group 2 metal salt and a phosphorous compound such as dimethyl phenylphosphonate.

JP-H06200131-A describes PEN-based polyesters and films made therefrom which exhibit improved electrical properties and which are suitable for electromagnetic tapes. The polyester comprises antimony, magnesium and phosphorus elements, wherein the phosphorus element may be selected from dimethyl methylphosphonate.

KR-101234613-B describes an optical polyester film with high heat resistance, comprising a polyester substrate layer and an adhesive polymeric resin primer layer on at least one side of the film. The polyester film comprises a flame retardant particle selected from carboxyphosphinic acid and dimethyl methylphosphonate.

According to a first aspect of the present invention, there is provided a polyester film, preferably an oriented polyester film, comprising a polymeric phosphonate flame retardant in an amount of from about 1.0 to about 25.0 wt %, by total weight of the film and further comprising at least one metal cation selected from the group consisting of Group I and Group II metal cations.

Preferably, there is provided a polyester film (preferably an oriented polyester film) comprising a polymeric phosphonate flame retardant in an amount of from about 1.0 to about 25.0 wt %, by total weight of the film and further comprising at least one metal cation selected from the group consisting of sodium and potassium metal cations.

The inventors have found that, surprisingly, said phosphonate flame retardant in combination with at least one metal cation selected from the group consisting of Group I and Group II metal cations (particularly sodium and potassium metal cations) is particularly beneficial in providing a polyester film which exhibits excellent flame retardancy and high clarity and transparency of the film. Surprisingly, the inventors have found that the polyester film exhibits said properties even at relatively low loadings of said phosphonate flame retardant.

The polyester film is a self-supporting film or sheet by which is meant a film or sheet capable of independent existence in the absence of a supporting base. The film may be a non-oriented (e.g. cast) polyester film. Preferably, the film is uniaxially or biaxially oriented, more preferably biaxially oriented.

The polyester(s) which constitute the film is/are preferably synthetic linear polyester(s). The polyester(s) which constitute the film is/are preferably crystallisable. The polyester(s) are thermoplastic. Suitable polyesters are obtainable by condensing one or more dicarboxylic acid(s) or their lower alkyl (up to 6 carbon atoms) diesters with one or more diols.

The dicarboxylic acid component contains at least one aromatic dicarboxylic acid, which is preferably terephthalic acid, isophthalic acid (IPA), phthalic acid, 1,4-, 2,5-, 2,6- or 2,7-naphthalenedicarboxylic acid, and is preferably terephthalic acid (TA) or 2,6-naphthalenedicarboxylic acid, and preferably terephthalic acid. The polyester may optionally contain one or more residues derived from other dicarboxylic acids such as 4,4'-diphenyldicarboxylic acid, hexahydro-terephthalic acid, 1,10-decanedicarboxylic acid, and in particular aliphatic dicarboxylic acids including those of the general formula $C_nH_{2n}(COOH)_2$ wherein n is 2 to 8, such as succinic acid, glutaric acid sebacic acid, adipic acid, azelaic acid, suberic acid or pimelic acid, preferably sebacic acid, adipic acid and azelaic acid, and more preferably azelaic acid.

The diols are preferably selected from aliphatic and cycloaliphatic diols, e.g. ethylene glycol (EG), 1,3-propane-diol, 1,4-butanediol and 1,4-cyclohexanedimethanol (CHDM), and preferably from ethylene glycol and 1,4-cyclohexanedimethanol (CHDM), preferably from ethylene glycol.

Polyethylene terephthalate (PET) or polyethylene 2,6-naphthalate (PEN), particularly PET, is the preferred polyester.

The preferred PET and PEN polyesters may optionally contain relatively minor amounts of one or more residues derived from the other dicarboxylic acids and/or diols described above, and where such minor amounts are present then the total amount of said other dicarboxylic acid(s) is preferably less than 10 mol %, preferably less than 5 mol %, preferably less than 1 mol % of the total dicarboxylic acid fraction of the polyester and/or the total amount of said other diol(s) is preferably less than 15 mol %, preferably less than 10 mol %, preferably less than 5 mol % of the total diol fraction of the polyester.

The polyester preferably contains only one dicarboxylic acid, preferably an aromatic dicarboxylic acid, preferably terephthalic acid or 2,6-naphthalenedicarboxylic acid, and preferably terephthalic acid. The polyester preferably contains only one diol, preferably an aliphatic diol, preferably ethylene glycol. Preferably the polyester contains one aromatic dicarboxylic acid and one aliphatic diol.

The film-forming polyester resin is the major component of the film, and makes up at least 50% by weight of the total weight of a given layer, preferably at least 60%, preferably at least 65%, preferably at least 70%, preferably at least 75%, preferably at least 80%, more typically at least 85%, more typically at least 90% by weight of the total weight of a given layer.

The intrinsic viscosity of the polyester from which the film is manufactured is preferably at least about 0.60, preferably at least about 0.61, preferably at least 0.62, preferably at least 0.63, preferably at least 0.64, preferably at least 0.65, preferably at least about 0.70, preferably at least about 0.75, and preferably at least about 0.80. Preferably, the intrinsic viscosity of the polyester is not more than 0.85, preferably not more than 0.83. The use of polyesters with too high a viscosity can lead to difficulties in film manufacture and/or require specialised, more robust film-forming equipment. For instance, increasing the viscosity too greatly may mean that it is appropriate to reduce output (i.e. reduce the amount of polyester extruded per unit time, which leads to a less economical process) or to increase the extrusion temperature in order to reduce the viscosity of the melt (which in turn can lead to thermal degradation of the polymer and the loss of associated properties) in order to achieve stable film production.

Formation of the polyesters is conveniently effected in a known manner by condensation or ester interchange, generally at temperatures up to about 295° C. In a preferred embodiment, solid state polymerisation may be used to increase the intrinsic viscosity of the polyesters to the desired value, using conventional techniques well-known in the art, for instance using a fluidised bed such as a nitrogen fluidised bed or a vacuum fluidised bed using a rotary vacuum drier.

The polyester film comprises said phosphonate flame retardant in an amount of from about 1.0 to about 25.0 wt %, preferably at least about 5 wt %, preferably at least about 10 wt %, preferably at least about 12 wt %, preferably no more than about 20 wt %, preferably no more than about 18 wt %, preferably about 15 wt %, by total weight of any given layer of the film.

The phosphonate flame retardant is preferably a phosphonate flame retardant of formula I:

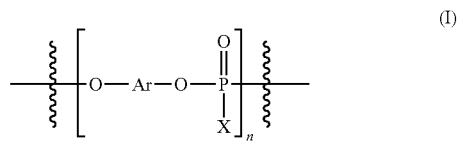

wherein:
Ar is an aromatic group and —O—Ar—O— is derived from a compound having one or more, optionally substituted, aryl rings such as, but not limited to, resorcinols, hydroquinones, and bisphenols, such as bisphenol A, bisphenol F, and 4,4'-biphenol, phenolphthalein, 4,4'-thiodiphenol, 4,4'-sulfonyldiphenol, or combinations of these;
X is a $C_{1-20}$ alkyl, $C_{2-20}$ alkene, $C_{2-20}$ alkyne, $C_{5-20}$ cycloalkyl or $C_{6-20}$ aryl; and
n is an integer from 1 to about 100, preferably from 1 to about 75, preferably from 2 to about 50, or any integer between these ranges.

The group X is preferably selected from a $C_{1-20}$ alkyl, preferably a $C_{1-10}$ alkyl, preferably a $C_{1-5}$ alkyl, preferably methyl.

The group —O—Ar—O— is preferably derived from bisphenol A, bisphenol F, and 4,4'-biphenol, preferably bisphenol A.

In a preferred embodiment, the phosphonate flame retardant is or comprises a phosphonate flame retardant of formula II:

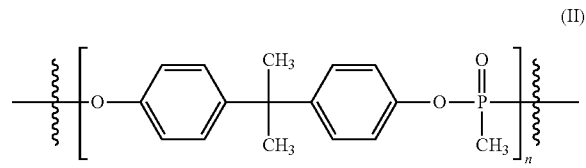

Further embodiments of suitable phosphonate flame retardant compounds are described in US-2016/0168760-A, the disclosure of which is incorporated herein by reference.

The weight average molecular weight (Mw) of the phosphonate flame retardant is preferably in the range from about 10,000 to about 120,000, preferably from about 50,000 to about 120,000, preferably from about 80,000 to about 120,000 g/mol. The molecular weight (Mw) is suitably determined by gel permeation chromatography (GPC) and measured against polystyrene (PS) standards, for instance using the equipment described hereinbelow.

The phosphonate flame retardant is preferably characterized by a phosphorus content of at least about 5 wt %, preferably at least about 8 wt %, preferably at least about 10 wt %, preferably no more than about 20 wt %, preferably no more than about 15 wt %, preferably no more than about 12 wt %, and is preferably about 11 wt %, by weight of the phosphonate flame retardant.

The glass transition temperature (Tg) of the phosphonate flame retardant is preferably in the range of from about 95 to about 120° C., preferably in the range of from about 110 to about 110° C.

The phosphonate flame retardant is preferably introduced into the polyester composition after the polyester is manufactured. Preferably, the phosphonate flame retardant is added to the polyester prior to or during the introduction of the polyester into the extruder used in the film-manufacturing process. Where the phosphonate flame retardant is added to the extruder used in the film-manufacturing process, it is preferably added at the start of the extruder barrel. The phosphonate flame retardant may be introduced into the extruder by a gravimetric feeder to provide the final film with the desired amount of phosphonate flame retardant. Masterbatching technology may also be used.

Thus, the phosphonate flame retardant is preferably blended with the polyester.

In a preferred embodiment, said phosphonate flame retardant is the only phosphorus-containing flame retardant additive, and preferably the only flame retardant additive, present in the oriented polyester film.

The phosphonate flame retardant may be at least partially copolymerised with the polyester, preferably to form a block copolymer.

The polyester film comprises at least one metal cation selected from the group consisting of Group I and Group II metal cations. Preferably, the amount of the metal cation present in a given layer is at least 10 ppm, preferably at least 15 ppm, at least 40 ppm, preferably at least 45 ppm, preferably at least 65 ppm, preferably at least 80 ppm, and preferably at least 100 ppm by weight, relative to the amount of polyester in a given layer. Preferably, the amount of the metal cation is not more than about 1000 ppm, preferably not more than about 500 ppm, preferably not more than about 275 ppm, typically not more than about 200 ppm, and in one embodiment not more than about 150 ppm by weight, relative to the amount of polyester in a given layer. Preferably, the amount of the metal cation is in the range from 45 ppm to 500 ppm, more preferably from 65 ppm to 275 ppm, more preferably from 100 ppm to 200 ppm by weight, relative to the amount of polyester in a given layer.

As used herein, the terms "Group I" and "Group II" have their conventional chemical meaning and refer to the corresponding Groups in the periodic table. In the present invention, the metal cations are preferably selected from Group I metal cations, preferably selected from sodium and potassium, and most preferably sodium.

The Group I or Group II cation is preferably present in the form of a salt with an appropriate counter-anion, preferably selected from hydroxide, polyacrylate, hydrogen carbonate, carboxylate, chloride, acetate, formate and nitrate. In a preferred embodiment, the anion is selected from hydroxide or polyacrylate, preferably polyacrylates. Suitable polyacrylates include those having a weight average molecular weight (Mw) of from about 1,000 to about 10,000 g/mol. Molecular weight determination herein may be conducted on a Hewlett-Packard 1050 Series HPLC system equipped with two GPC Ultrastyragel columns, $10^3$ and $10^4$ Å (5 μm mixed, 300 mm×19 mm, Waters Millipore Corporation, Milford, MA, USA) and THF as mobile phase. The molecular weight is calculated by comparison with the retention times of polystyrene standards.

It has been found that the incorporation of such metal cation-containing species results in a film with excellent flame retardancy and high clarity and transparency.

The metal cation(s) (preferably in the form of its salt) may be added to the polyester or its monomers prior to polymerisation. In a preferred embodiment, the metal cations (preferably in the form of its salt) are added at the start of the polymerisation reaction to prepare the polyester.

The polyester film may further comprise any other additive conventionally employed in the manufacture of polyester films. Thus, agents such as particulate fillers, hydrolysis stabilisers, anti-oxidants, UV-stabilisers, cross-linking agents, dyes, lubricants, radical scavengers, thermal stabilisers, surface active agents, gloss improvers, prodegradents, viscosity modifiers and dispersion stabilisers may be incorporated as appropriate. Of particular utility in the present invention are particulate fillers, hydrolysis stabilisers (preferably glycidyl esters of branched monocarboxylic acids) and anti-oxidants (preferably hindered phenols, secondary aromatic amines and hindered amines), and suitable additives in this regard are disclosed in WO-2012/120260-A, the disclosure of which additives is incorporated herein by reference. UV-stabilisers are also of particular utility.

Particulate fillers can improve handling and windability during manufacture and/or modulate optical properties, as is well known in the art. The particulate filler is typically a particulate inorganic filler (e.g. metal or metalloid oxides, such as alumina, titania, talc and silica (especially precipitated or diatomaceous silica and silica gels), calcined china clay and alkaline metal salts, such as the carbonates and sulphates of calcium and barium). A particulate inorganic filler is preferably finely-divided, and the volume distributed median particle diameter (equivalent spherical diameter corresponding to 50% of the volume of all the particles, read on the cumulative distribution curve relating volume % to the diameter of the particles—often referred to as the "D(v, 0.5)" value) thereof is preferably in the range from 0.01 to 5 μm, more preferably 0.05 to 1.5 μm, and particularly 0.15 to 1.2 μm. Preferably at least 90%, more preferably at least 95% by volume of the inorganic filler particles are within the range of the volume distributed median particle diameter ±0.8 μm, and particularly ±0.5 μm. Particle size of the filler particles may be measured by electron microscope, coulter counter, sedimentation analysis and static or dynamic light scattering. Techniques based on laser light diffraction are preferred. The aforementioned conventionally employed additives may be introduced into the polymer in a conventional manner. For example, by mixing with the monomeric reactants from which the film-forming polymer is derived, or the components may be mixed with the polymer by tumble or dry blending or by compounding in an extruder, followed by cooling and, usually, comminution into granules or chips. Masterbatching technology may also be employed.

Formation of the polyester film may be effected by conventional extrusion techniques well-known in the art. In general terms the process comprises the steps of extruding a layer of molten polymer at a temperature within the range of from about 275 to about 300° C., preferably from about 290 to 295° C., quenching the extrudate and orienting the quenched extrudate. Orientation may be effected by any process known in the art for producing an oriented film, for example a tubular or flat film process. Biaxial orientation is effected by drawing in two mutually perpendicular directions in the plane of the film to achieve a satisfactory combination of mechanical and physical properties. In a tubular process, simultaneous biaxial orientation may be effected by extruding a thermoplastics polyester tube which is subsequently quenched, reheated and then expanded by internal gas pressure to induce transverse orientation, and withdrawn at a rate which will induce longitudinal orientation. In the preferred flat film process, the film-forming polyester is extruded through a slot die and rapidly quenched upon a chilled casting drum to ensure that the polyester is quenched to the amorphous state. Orientation is then effected by stretching the quenched extrudate in at least one direction at a temperature above the glass transition temperature of the polyester. Sequential orientation may be effected by stretching a flat, quenched extrudate firstly in one direction, usually the longitudinal direction, i.e. the forward direction through the film stretching machine, and then in the transverse direction. Forward stretching of the extrudate is conveniently effected over a set of rotating rolls or between two pairs of nip rolls, transverse stretching then being effected in a stenter apparatus. Stretching is generally effected so that the dimension of the oriented film is from 2 to 5, more preferably 2.5 to 4.5 times its original dimension in the or each direction of stretching. More preferably, stretching is effect so that the dimension of the oriented film is from 3.0 to 3.3 times its original dimension in the forward draw, and from 3.3 to 3.9 times its original dimension in the sideways draw. Greater draw ratios (for example, up to about 8 times) may be used if orientation in only one direction is required. Typically, stretching is effected at temperatures higher than the $T_g$ of the polyester, preferably about 15° C. higher than the $T_g$. It is not necessary to stretch equally in the machine and transverse directions although this is preferred if balanced properties are desired.

A stretched film may be, and preferably is, dimensionally stabilised by heat-setting under dimensional support at a temperature above the glass transition temperature of the polyester but below the melting temperature thereof, to induce the desired crystallisation of the polyester. During the heat-setting, a small amount of dimensional relaxation may be performed in the transverse direction (TD) by a procedure known as "toe-in". Toe-in can involve dimensional relaxation of the order 2 to 4%. While dimensional relaxation in the process or machine direction (MD) is also possible, as is known in the art. The actual heat-set temperature and time will vary depending on the composition of the film and its desired final thermal shrinkage but should not be selected so as to substantially degrade the toughness properties of the film such as tear resistance. Within these constraints, a heat set temperature of about 180 to 245° C. is generally desirable. In one embodiment, the heat-set-temperature is within the range of from about 200 to about 225° C., which provides improvements in hydrolytic stability. After heat-setting the film is typically quenched rapidly in order induce the desired crystallinity of the polyester.

Preferably, the film is further stabilized through use of an in-line relaxation stage. Alternatively the relaxation treatment can be performed off-line. In this additional step, the film is heated at a temperature lower than that of the heat-setting stage, and with a much reduced MD and TD tension. The tension experienced by the film is a low tension and typically less than 5 kg/m, preferably less than 3.5 kg/m, preferably less than 2.5 kg/m, and typically in the range of 1.0 to 2.0 kg/m of film width. For a relaxation process which controls the film speed, the reduction in film speed (and therefore the strain relaxation) is typically in the range 0 to 2.5%, preferably 0.5 to 2.0%. There is no increase in the transverse dimension of the film during the heat-stabilisation step. The temperature to be used for the heat stabilisation step can vary depending on the desired combination of properties from the final film, with a higher temperature giving better, i.e. lower, residual shrinkage properties. A temperature of 135 to 250° C. is generally desirable, preferably 150 to 230° C., more preferably 170 to 200° C. The duration of heating will depend on the temperature used but is typically in the range of 10 to 40 seconds, with a duration of 20 to 30 seconds being preferred. This heat stabilisation process can be carried out by a variety of methods, including flat and vertical configurations and either "off-line" as a separate process step or "in-line" as a continuation of the film manufacturing process. Film thus processed will exhibit a smaller thermal shrinkage than that produced in the absence of such post heat-setting relaxation.

The polyester film may be either a single layer or a composite structure comprising a plurality of polyester layers. One layer of a multi-layer polyester film may be a heat-sealable layer, as described hereinbelow. In a preferred embodiment, the polyester film is a single layer. Formation of a composite structure is preferably effected by co-extrusion, either by simultaneous coextrusion of the respective film-forming layers through independent orifices of a multi-orifice die, and thereafter uniting the still molten layers or, preferably, by single-channel coextrusion in which molten streams of the respective polymers are first united within a channel leading to a die manifold, and thereafter extruded together from the die orifice under conditions of streamline flow without intermixing thereby to produce a multi-layer film, which may be oriented and heat-set as hereinbefore described. The polyester layers of a composite film are selected from the polyesters described hereinabove, and preferably from PET or PET-based polyesters. Any or each layer in a composite film may comprise any of the additives mentioned above, wherein the additive(s) in a given layer may be the same as or different to the additive(s) in other layers, and in the same or different amounts. Preferably, phosphonate flame retardant is in at least the outer layers of a multi-layer film and preferably in each layer of a multi-layer film. In one embodiment, the polyester film comprises 2 or 3 layers, preferably having an AB or BAB layer structure. An outer layer of a multi-layer polyester film suitably comprises particulate fillers to improve handling and windability during manufacture, as is conventional in the art, and such particulate filler is suitably present in amounts, generally not exceeding 2.5%, preferably not exceeding 2.0%, preferably not exceeding 1.1%, preferably not exceeding 0.6%, preferably not exceeding 0.5% and preferably not exceeding 0.3% by weight of a layer.

The film of the present invention may be heat-sealable. The heat-sealable functionality is preferably provided by disposing a heat-sealable layer on a polyester base layer. Alternatively, the polyester of a mono-layer film may itself be heat-sealable. Preferably, however, the heat-sealable functionality is provided by disposing a heat-sealable layer on a polyester base layer which is not itself heat-sealable.

A heat-sealable polyester is preferably a copolyester selected from copolyesters derived from one or more diol(s) and one or more dicarboxylic acid(s), wherein the copolyester comprises at least three different types of monomeric repeating units, and preferably wherein the aliphatic diol(s) and dicarboxylic acid(s) are selected from the dicarboxylic acids and diols described above. The copolyester of a heat-sealable copolyester layer is the major component of that layer, and makes up at least 50% by weight of the total weight of the layer, preferably at least 65%, preferably at least 80%, preferably at least 90%, more typically at least 95% by weight of the total weight of the layer. A heat-sealable copolyester is preferably selected from:

(i) Copolyesters comprising and preferably consisting of a first aromatic dicarboxylic acid (preferably TA), a second aromatic dicarboxylic acid and an aliphatic diol, preferably wherein the copolyester is derived from repeating units consisting of TA, IPA and EG. In this embodiment, the second aromatic dicarboxylic acid (preferably IPA) is preferably present in an amount of from about 5 to about 30 mol %, preferably from about 10 to about 25 mol %, preferably from about 10 to about 20 mol %, and preferably from about 15 to about 20 mol % of the acid fraction of the copolyester.

(ii) Copolyesters comprising and preferably consisting of a first aromatic dicarboxylic acid (preferably TA), an aliphatic diol (preferably EG) and a cycloaliphatic diol (preferably CHDM). Preferably the copolyester contains only one aromatic dicarboxylic acid (preferably TA). Preferably the copolyester contains only one aliphatic diol (preferably EG) glycol. Preferably the copolyester contains only one cycloaliphatic diol (preferably CHDM). A preferred copolyester is derived from TA, EG and CHDM. The preferred molar ratios of the cycloaliphatic diol to the aliphatic diol are in the range from 10:90 to 70:30, preferably 10:90 to 60:40, preferably in the range from 20:80 to 40:60, and more preferably from 30:70 to 35:65. Thus, it is preferred that the glycol fraction of the copolyester comprises from 10 to 70 mol %, preferably 10 to 60 mol %, preferably 20 to 40 mol %, preferably 30 to 35 mol % cycloaliphatic diol and from 30 to 90 mol %, preferably 40 to 90 mol %, preferably 60 to 80 mol %, preferably 65 to 70 mol % aliphatic diol. In a preferred embodiment, this copolyester is a copolyester of terephthalic acid wherein the glycol fraction comprises about 33 mol % 1,4-cyclohexanedimethanol and about 67 mol % ethylene glycol.

(iii) Copolyesters comprising and preferably consisting of an aromatic dicarboxylic acid, an aliphatic dicarboxylic acid and an aliphatic diol. A preferred aromatic dicarboxylic acid is terephthalic acid. Preferred aliphatic dicarboxylic acids are selected from sebacic acid, adipic acid and azelaic acid. The concentration of the aromatic dicarboxylic acid present in the copolyester is preferably in the range from 45 to 80, more preferably 50 to 70, and particularly 55 to 65 mole % based on the dicarboxylic acid components of the copolyester. The concentration of the aliphatic dicarboxylic acid present in the copolyester is preferably in the range from 20 to 55, more preferably 30 to 50, and particularly 35 to 45 mole % based on the dicarboxylic acid components of the copolyester. Particularly preferred examples of such copolyesters: are (a) copolyesters of azeleic acid and terephthalic acid with an aliphatic glycol, preferably ethylene glycol; (b) copolyesters of adipic acid and terephthalic acid with an aliphatic glycol, preferably ethylene glycol; and (c) copolyesters of sebacic acid and terephthalic acid with an aliphatic glycol, preferably butylene glycol.

In an alternative embodiment, heat-sealable functionality may be provided by coating a non-polyester heat-seal polymer onto the polyester film described herein. Suitable heat-seal layers comprise and preferably consist of an ethylene vinyl acetate (EVA). Suitable EVA polymers may be obtained from DuPont as Elvax™ resins. Typically, these resins have a vinyl acetate content in the range of 9% to 40%, and typically 15% to 30%.

Formation of a heat-sealable layer may be effected by conventional techniques, the method of formation depending on the identity of the heat-sealable layer. Heat-sealable layers comprising copolyesters (i) and (ii) are suitably prepared by coextrusion. Heat-sealable layers comprising copolyester (iii) and EVA are suitably prepared by coating the heat-sealable polymer onto the polyester layer described hereinabove. Coating may be effected using any suitable coating technique, for instance as described hereinbelow. The thickness of a heat-sealable layer is preferably no more than 40%, more preferably no more than 30% and more preferably no more than 25%, and preferably at least 2.5% more preferably at least 5%, and preferably from about 10% to about 20%, of the total thickness of the film.

In the most preferred embodiment, the polyester film is optically clear. As used herein, the term "optically clear" refers to a layer that provides a percentage of scattered light in the visible wavelength range of no more than 8%, preferably no more than 5% preferably no more than 4%, preferably no more than 3%, preferably no more than 2%, more preferably no more than 1%, and/or a total luminous transmission (TLT) for light in the visible region (400 nm to 700 nm) of at least 80%, preferably at least 88%, more preferably at least about 90%, more preferably at least about 92%. Preferably, an optically clear film fulfils both of these criteria. In this embodiment, any filler in the film is typically present in only small amounts, generally not exceeding 2.5%, preferably not exceeding 2.0%, preferably not exceeding 1.1%, preferably not exceeding 0.6% and preferably not exceeding 0.3% by weight of a layer, preferably wherein the filler is silica. In this embodiment, the windability of the film (i.e. the absence of blocking or sticking when the film is wound up into a roll) is improved, without an unacceptable reduction in haze or other optical properties.

In an alternative embodiment, the polyester film is opaque. An opaque film preferably exhibits a Transmission Optical Density (TOD) of at least 0.4, preferably at least 0.5, preferably at least 0.6, preferably at least 0.7, preferably at least 1.0 and preferably at least 1.5, and in one embodiment preferably at least 2.0, preferably at least 3.0, and preferably at least 4.0. Suitable opacifying agents include carbon black, or a metallic filler such as aluminium powder, as is known in the art. An opaque film may be pigmented as required, and for instance may be white, grey or black. Suitable whitening agents include the particulate inorganic fillers referred to hereinabove, particularly barium sulphate and titanium dioxide, and particularly titanium dioxide. A white film preferably exhibits a whiteness index of at least 60, preferably at least 85, preferably at least 90, preferably at least 95, typically no more than about 120, typically no more than about 105 units, and/or an L* value preferably greater than 85, preferably greater than 90, preferably greater than 92.00, and typically in the range from 90.00 to 100.00, more typically from 92.00 to 95.00.

The intrinsic viscosity of the polyester film is preferably at least about 0.70, preferably at least about 0.75, preferably at least 0.80, and preferably no more than about 0.85, preferably no more than about 0.83.

The polyester film of the present invention exhibits surprisingly good flame retardant properties. In particular, the polyester film exhibits a VTM0 rating (as defined in the UL test method described hereinbelow), which has long been an objective of polyester film manufacturers. Conventional polyester films typically exhibit flame classification ratings no better than the VTM2 rating. However, for many applications, a polymeric component is only deemed acceptable for use as part of a device or appliance with respect to its flammability if it exhibits a VTM0 rating, which has limited the range of applications in which polyester films have been used.

The film of the present invention is semi-crystalline. As used herein, the term "semi-crystalline" refers to a film which exhibits a crystallinity of at least 5%, preferably at least 10%, preferably at least 15%, preferably at least 20%, preferably at least 25%, and typically no higher than 50% or 45% or 40%.

The polyester film of the invention preferably exhibits a low shrinkage, preferably less than 10%, preferably less than 5%, preferably less than 3%, preferably less than 2%, preferably less than 1% at 150° C. over 30 minutes, particularly in the machine (longitudinal dimension) of the film. Preferably such shrinkage values are exhibited in both dimensions of the film (i.e. the longitudinal and transverse dimensions).

The film of the present invention preferably exhibits an Ultimate Tensile Strength (UTS) in each of the longitudinal and transverse directions of the film of at least about 15, preferably at least about 18, preferably at least about 19, preferably at least about 20, preferably at least about 21 kg/mm$^2$.

The multi-layer film of the present invention preferably exhibits an Elongation To Break (ETB) in each of the longitudinal and transverse directions of the film of at least 130%, preferably at least 150%, preferably at least 160%, preferably at least 170%, preferably at least 180%, preferably at least 190%, preferably at least 200%.

It will be appreciated that the terms "longitudinal direction" and "transverse direction" of the film refer to the directions in which a film was stretched during its manufacture. The term "machine direction" is also used herein to refer to the longitudinal direction.

The polyester film of the present invention may optionally have coated therein an acrylic resin layer. Such an acrylic layer may be used as adhesion-promoting layer, for instance as an ink-receptive layer to improve the adhesion of inks inks, dyes and/or lacquers etc to the surface of the polyester film.

As used herein, the term "acrylic resin" refers to a resin which comprises at least one acrylic and/or methacrylic component.

The acrylic resin of the ink-receptive layer is suitably thermoset.

The acrylic resin of the ink-receptive layer preferably comprises at least one monomer derived from an ester of acrylic acid and/or an ester of methacrylic acid, and/or derivatives thereof. Preferably, the acrylic resin comprises greater than 50 mole %, preferably less than 98 mole %, more preferably in the range from 60 to 97 mole %, particularly 70 to 96 mole %, and especially 80 to 94 mole % of at least one monomer derived from an ester of acrylic acid and/or an ester of methacrylic acid, and/or derivatives thereof. A preferred acrylic resin comprises an alkyl ester of acrylic and/or methacrylic acid where the alkyl group contains up to ten carbon atoms such as methyl, ethyl, n-propyl, isopropyl, n-butyl, isobutyl, terbutyl, hexyl, 2-ethylhexyl, heptyl, and n-octyl. Preferably, the acrylic resin comprises an alkyl acrylate (preferably an ethyl acrylate and/or butyl acrylate) and an alkyl methacrylate (preferably methyl methacrylate), and preferably the acrylic resin comprises ethyl acrylate and methyl methacrylate. The acrylate monomer is preferably present in a proportion in the range from 20 to 80 mole % (preferably 30 to 65 mole %), and the methacrylate monomer is preferably present in a proportion in the range from 20 to 80 mole % (preferably from 20 to 60 mole %).

Other monomers which are suitable for use in the preparation of the acrylic resin, which are preferably copolymerised as optional additional monomers together with said esters of acrylic acid and/or methacryllc acid and/or derivatives thereof, include acrylonitrile, methacrylonitrile, halo-substituted acrylonitrile, halo-substituted methacrylonitrile, acrylamide, methacrylamide, N-methylol acrylamide, N-ethanol acrylamide, N-propanol acrylamide, N-methacrylamide, N-ethanol methacrylamide, N-methyl acrylamide, N-tertiary butyl acrylamide, hydroxyethyl methacrylate, glycidyl acrylate, glycidyl methacrylate, dimethylamino ethyl methacrylate, itaconic acid, itaconic anhydride and half esters of itaconic acid. Other optional monomers include vinyl esters such as vinyl acetate, vinyl chloroacetate and vinyl benzoate, vinyl pyridine, vinyl chloride, vinylidene chloride, maleic acid, maleic anhydride, styrene and derivatives of styrene such as chloro styrene, hydroxy styrene and alkylated styrenes, wherein the alkyl group contains from one to ten carbon atoms.

A preferred acrylic resin is derived from three monomers and comprises 35 to 60 mole % (preferably 40 to 50 mole %) of ethyl acrylate, 30 to 55 mole % (preferably 40 to 50 mole %) of methyl methacrylate, and 2 to 20 mole % (preferably 5 to 10 mol %) of acrylamide or methacrylamide, and preferably comprises approximate molar proportions 46/46/8% respectively of ethyl acrylate/methyl methacrylate/acrylamide or methacrylamide. Preferably, the polymer is thermoset, for example in the presence of about 25 weight % of a methylated melamine-formaldehyde resin.

A further preferred acrylic resin is derived from four monomers and comprises a copolymer comprising comonomers (a) 35 to 40 mole % alkyl acrylate, (b) 35 to 40 mole % alkyl methacrylate, (c) 10 to 15 mole % of a monomer containing a free carboxyl group, and (d) 15 to 20 mole % of a monomer containing a sulphonic acid group and/or a salt thereof. Ethyl acrylate is a particularly preferred monomer (a) and methyl methacrylate is a particularly preferred monomer (b). Monomer (c) containing a free carboxyl group (i.e. a carboxyl group other than those involved in the polymerisation reaction by which the copolymer is formed) suitably comprises a copolymerisable unsaturated carboxylic acid, and is preferably selected from acrylic acid, methacrylic acid, maleic acid, and/or itaconic acid (and preferably from acrylic acid and itaconic acid). The sulphonic acid group monomer (d) may be present as the free acid and/or a salt thereof, for example as the ammonium, substituted ammonium, or an alkali metal, such as lithium, sodium or potassium, salt. The sulphonate group does not participate in the polymerisation reaction by which the copolymer resin is formed. The sulphonic acid group monomer is preferably aromatic, and more preferably is p-styrene sulphonic acid and/or a salt thereof.

The weight average molecular weight (Mw; measured as described herein) of the acrylic resin can vary over a wide range but is preferably in the range from 10,000 to 1,000,000, and more preferably 50,000 to 200,000.

The acrylic resin component of the ink-receptive layer preferably comprises at least 30%, more preferably in the range from 40 to 99%, particularly 50 to 85%, and especially 70 to 80% by weight relative to the total weight of the ink-receptive layer. The acrylic resin of the ink-receptive layer is preferably the major component of the layer.

The composition from which the ink-receptive layer of the second embodiment is derived suitably also contains a cross-linking agent, particularly wherein the ink-receptive layer is an acrylic resin-containing layer. The cross-linking agent functions to improve adhesion to the polyester base layer. The cross-linking agent should also function to internally cross-link the ink-receptive layer to provide solvent resistance. Suitable cross-linking agents comprise epoxy resins, alkyd resins, amine derivatives such as hexamethoxymethyl melamine, and/or condensation products of an amine, e.g. melamine, diazine, urea, cyclic ethylene urea, cyclic propylene urea, thiourea, cyclic ethylene thiourea, alkyl melamines, aryl melamines, benzo guanamines, guanamines, alkyl guanamines and aryl guanamines, with an aldehyde, e.g. formaldehyde. A useful condensation product is that of melamine with formaldehyde. The condensation product is optionally alkoxylated. The cross-linking agent may suitably be used in amounts of up to 70%, preferably in the range from 1 to 60%, more preferably 15 to 50%, and especially 20 to 30% by weight relative to the total weight of the ink-receptive layer. A catalyst is preferably employed to facilitate cross-linking action of the cross-linking agent. Preferred catalysts for cross-linking melamine formaldehyde include para toluene sulphonic acid, maleic acid stabilised by reaction with a base, morpholinium paratoluene sulphonate, and ammonium nitrate.

The composition from which the ink-receptive layer of the second embodiment is derived optionally contains a plasticizer to aid film formation and handling. Any suitable plasticizer may be used, for instance phthalate esters such as alkyl benzyl phthalates, dialkyl adipate and m.p-cresol propoxylate.

The acrylic resin is generally water-insoluble. Typically, the acrylic resin is applied to the polyester base layer as a coating composition in the form of an aqueous dispersion.

An acrylic resin-containing ink-receptive layer may be applied, typically in the form of a coating composition, before, during or after the stretching operation in the production of an oriented film. The coating composition is preferably applied to the polyester base layer between the two stages (longitudinal and transverse) of a biaxial stretching operation. An acrylic resin-coated polyester base layer is heated (typically up to 240° C., preferably up to 220° C.) in order to drive off the diluent of the composition (normally water, although organic solvent(s) can be used additionally or alternatively), and to assist in coalescing and forming the coating into a continuous and uniform layer, as well as facilitating cross-linking of cross-linkable coating compositions. Any suitable conventional coating technique such as dip coating, bead coating, reverse roller coating or slot coating may be used. The coating composition is preferably applied to the polyester base layer at a dry coat weight in the range from about 0.05 to 5 mg/dm$^2$, especially 0.1 to 2.0 mg/dm$^2$.

The thickness of an ink-receptive layer (preferably the acrylic resin-containing ink-receptive layer) in the second embodiment is preferably no more than 1.5 μm, more preferably in the range of from 0.01 to 1.0 μm, and particularly 0.02 to 0.5 μm.

The total thickness of the film of the present invention is preferably no more 500 μm, preferably no more than 350 μm, preferably no more than 250 μm, preferably no more than 150 μm, preferably no more than 100 μm, preferably no more than 75 μm, preferably no more than 50 μm, preferably at least about 5 μm, typically at least about 10 μm.

The films of the present invention are suitable for any environment or end-use where flame retardancy is desired or advantageous, for instance in screens, shades or wall coverings, in the manufacture of electrical components and circuits such as capacitors and flexible printed circuitry, membrane touch switches, and in the manufacture of components for use in the construction and transport industries. The films are particularly useful in the manufacture of building cladding. The films are also particularly suitable as materials suitable for use in the interior of aircraft.

According to a second aspect of the invention, there is provided the use of a polymeric phosphonate flame retardant and at least one metal cation selected from the group consisting of Group I and Group II metal cations (particularly sodium and potassium, and particularly sodium) in a polyester film (particularly an oriented film) for imparting flame retardancy to or improving the flame retardancy of the polyester film, wherein the polyester film comprises the polymeric phosphonate flame retardant in an amount of from about 1.0 to about 25.0 wt %, by total weight of the film.

According to a third aspect of the invention, there is provided a method for imparting flame retardancy to or improving flame retardancy of a polyester film (particularly an oriented film), the method comprising the step of providing in the film a combination of a polymeric phosphonate flame retardant, in an amount of from about 1.0 to about 25.0 wt % by total weight of the film, and at least one metal cation selected from the group consisting of Group I and Group II metal cations (particularly sodium and potassium, and particularly sodium).

It will be appreciated that the preferences and elements described in respect of the first aspect of the invention apply equally to the second and third aspects of the invention.

It will be appreciated that the term "improving flame retardancy" as used herein means that the flame retardancy of the polyester film is improved relative to a polyester film in which the combination of said polymeric phosphonate flame retardant and said at least one metal cation is absent.

In particular, said use or method to impart flame retardancy to or improve flame retardancy of said polyester film is preferably a use or method to impart to the polyester film a VTM-0 rating in the UL 94 test method.

In a preferred embodiment, said use or method is a use or method to provide the polyester film with said flame retardancy characteristics in combination with high clarity and transparency, as defined herein.

Property Measurement

The following analyses were used to characterize the films described herein:

(i) Optical clarity is evaluated by measuring total luminance transmission (TLT) and haze (% of scattered transmitted visible light) through the total thickness of the film using an M57D spherical hazemeter (Diffusion Systems) according to the standard test method ASTM D1003.

(ii) Transmission Optical Density (TOD) is measured using a Macbeth Densitometer TR 927 (obtained from Dent and Woods Ltd, Basingstoke, UK) in transmission mode.

(iii) L*, a* and b* colour co-ordinate values (CIE (1976)), whiteness index and yellowness index are measured using standard colouring measuring apparatus conforming to the principles of ASTM D 313, such as a Konica Minolta CM3600a.

(iv) Flame retardancy is assessed by the UL 94 Vertical Flame Test for Thin Materials (VTM) method. Test samples, 200 mm×50 mm, were cut from each film sample and wrapped around a rod to form a "coned" shape. Five test samples from each film sample were used in the testing. There was no conditioning of the samples. A line was drawn 75 mm from the top of the rods. Before flame application the top of each rod was held shut by a spring clamp which, with a stand, held the test sample vertical. A burner flame was adjusted to produce a blue flame 20±1 mm. Continuous adjustment of the propane supply and the air-port was necessary to achieve the correct height. The film sample was held vertically and the flame applied to the bottom of the tube 10 mm below the film at an angle of 45°. Flame application was for 3 seconds, maintaining the 10 mm distance by moving the burner upwards as the film shrank away from it. After 3 seconds the flame was moved away from the sample and the duration (in seconds) of flaming after the first flame application noted (A). A repeat 3 second application was completed and the duration (in seconds) of flaming plus glowing after the second flame application (B) noted. The total duration (in seconds) of flaming for all 5 samples is noted (C). If a specimen burned to the 125 mm mark, observation D was yes. During the flame application if any drips of molten polymer fell from the sample, observation E was yes. During the flame application if any burns to holding clamp, observation F was yes.
The classification for this test method is provided below:

|  | VTM-0 | VTM-1 | VTM-2 |
| --- | --- | --- | --- |
| A (seconds) | ≤10 | ≤30 | ≤30 |
| B (seconds) | ≤30 | ≤60 | ≤60 |
| C (seconds) | ≤50 | ≤250 | ≤250 |
| D | No | No | No |
| E | No | No | Yes |
| F | No | No | No |

(v) Intrinsic viscosity (in units of dL/g) of the polyester and polyester film is measured by solution viscometry in accordance with ASTM D5225-98(2003) on a Viscotek™ Y-501C Relative Viscometer (see, for instance, Hitchcock, Hammons & Yau in *American Laboratory* (August 1994) "The dual-capillary method for modern-day viscometry") by using a 0.5% by weight solution of polyester in o-chlorophenol at 25° C. and using the Billmeyer single-point method to calculate intrinsic viscosity:

$$\eta = 0.25\eta_{red} + 0.75(\ln \eta_{rel})/c$$

wherein:
$\eta$=the intrinsic viscosity (in dL/g),
$\eta_{rel}$=the relative viscosity,
c=the concentration (in g/dL), &
$\eta_{red}$=reduced viscosity (in dL/g), which is equivalent to $(\eta_{rel}-1)/c$ (also expressed as $\eta_{sp}/c$ where $\eta_{sp}$ is the specific viscosity).

(vi) The Ultimate Tensile Strength (UTS), Elongation To Break (ETB) and the F5 value (stress at 5% elongation) are measured according to test method ASTM D882. Using a straight edge and a calibrated sample cutter (10 mm+\−0.5 mm) five strips (100 mm in length) of the film are cut along the machine direction. Each sample is tested using an Instron model 3111 materials test machine, using pneumatic action grips with rubber jaw faces. Temperature (23° C.) and relative humidity (50%) are controlled. The crosshead speed (rate of separation) is 25 mm·min$^{-1}$. The strain rate is 50%. Elongation to Break ($\epsilon_B$ (%)) is defined as:

$$\epsilon_B (\%) = (\text{extension at break}/L_0) \times 100$$

where $L_0$ is the original length of the sample between grips.

(vii) Heat-sealability may be assessed by measuring the heat-seal strength of the film, as follows. Samples of the film are positioned together such that the heat-sealable layers of each film are in contact with each other. A heat-seal is formed by positioning together and heating the heat-sealable layers at 140° C. for ten seconds under a pressure of 275 kPa (40 psi). The sealed film is cooled to room temperature, and the heat-seal strength determined by measuring the force required under linear tension per unit width of seal to peel the layers of the film apart at a constant speed of 4.23 mm/second.

(viii) Thermal shrinkage is assessed for film samples of dimensions 200 mm×10 mm which were cut in specific directions relative to the machine and transverse directions of the film and marked for visual measurement. The longer dimension of the sample (i.e. the 200 mm dimension) corresponds to the film direction for which shrinkage is being tested, i.e. for the assessment of shrinkage in the machine direction, the 200 mm dimension of the test sample is oriented along the machine direction of the film. After heating the specimen to the predetermined temperature of 150° C. (by placing in a heated oven at that temperature and holding for an interval of 30 minutes, it was cooled to room temperature and its dimensions re-measured manually. The thermal shrinkage was calculated and expressed as a percentage of the original length.

(ix) Glass transition temperature ($T_g$) and crystalline melting point ($T_m$) were measured by differential scanning calorimetry (DSC) using a PerkinElmer HyperDSC 8500. Unless otherwise stated, measurements were made according to the following standard test method and based on the method described in ASTM E1356-98. The sample was maintained under an atmosphere of dry nitrogen for the duration of the scan. A flow rate of 20 ml min$^{-1}$ and Al pans were used. Samples (5 mg) were heated at 20° C./min from 20° C. to 350° C.

The value of a $T_g$ was determined as the extrapolated onset temperature of the glass transition observed on the DSC scans (heat flow (W/g) against temperature (° C.)), as described in ASTM E1356-98. The value of a $T_m$ was determined from the DSC scans as the peak endotherm of the transition.

(x) Crystallinity was measured from the DSC analysis described hereinabove as the degree of crystallinity ($X_c$) calculated according to the equation:

$$X_c = \Delta H_m / \Delta H_m°$$

wherein:
$\Delta H_m$=experimental enthalpy of fusion calculated from the integral of the melting endotherm;
$\Delta H_m°$=theoretical enthalpy of fusion of the corresponding poly(alkylene-carboxylate) homopolymer at 100% crystallinity. Thus, for PET (or PET-based) polyesters, $\Delta H_m°$ is the theoretical enthalpy of fusion of a 100% crystalline PET polymer (140 J/g), and for PEN (or PEN-based) polyesters, $\Delta H_m°$ is the theoretical enthalpy of fusion of a 100% crystalline PEN polymer (103 J/g), as defined in the literature (B. Wunderlich, *Macromolecular Physics*, Academic Press, New York, (1976)).

The invention is further illustrated by reference to the following examples. The examples are not intended to limit the scope of the invention as described above.

EXAMPLES

A series of PET polyesters (P1 to P7) were prepared using a conventional synthetic procedure and comprising various additives, as shown in Table 1. The amounts in Table 1 are provided by weight relative to the final weight of the polymer produced, unless otherwise indicated. Polyesters P1, P2 and P7 were subjected to solid state polymerisation to increase their IV.

TABLE 1

| Polyester | Additives | IV |
|---|---|---|
| P1 | China clay: 0.21 wt %; Sodium salt of an acrylic copolymer (500 ppm of a 40% solids aq. dispersion) | 0.80 |
| P2 | Irganox ® 1010 (Ciba-Geigy; tetrakis-(methylene 3-(4'-hydoxry-3', 5'-di-t-butylphenyl propionate) methane): 500 ppm; Sodium salt of an acrylic copolymer (40% solids aq. dispersion): 500 ppm | 0.80 |
| P3 | Silicone resin particles (average particle size 2 μm): 1800 ppm Amorphous silica particles (average particle size 0.25-0.35 μm): 2600 ppm | 0.62 |
| P4 | Micronized synthetic amorphous silica-gel particles Sylysia 340: 1.10 wt % | 0.61 |
| P5 | China clay: 1.05 wt % | 0.63 |
| P6 | — | 0.62 |
| P7 | — | 0.65 |

Comparative Examples 1-4 and Examples 1-3

A first series of polyester films based on polyesters P1, P6 and P7 was made. Forwards draw ratios were from about 3.0 to 3.3; sideways draw ratios were from about 3.3 to 3.5; and heat-setting was conducted at a temperatures of from about 190 to about 225° C., preferably with an initial zone having a temperature of about 225° C. and a final zone having a temperature of about 190° C. A phosphonate flame retardant of formula I was added to the polyester at the start of the barrel of the extruder during film manufacture. In all cases, the phosphonate flame retardant was FRX Nofia® HM1100 (available from FRX Polymers, Inc.) which has the structure shown below as formula (1):

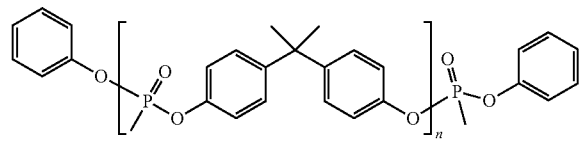

(1)

The amount of phosphonate flame retardant present in the film is shown in Table 2, which also shows the haze and TLT (measured as described herein) of the final film.

TABLE 2

| Example | Polymer | Flame retardant (wt %) | Extrusion temperature (° C.) | Haze (%) | TLT (%) |
|---|---|---|---|---|---|
| Comp. Example 1 | P6 | 5 | 275 | 17.2 | 82.9 |
| Comp. Example 2 | P6 | 10 | 275 | 25.2 | 78.8 |
| Comp. Example 3 | P7 | 5 | 275 | 9.98 | 85.9 |
| Comp. Example 4 | P7 | 10 | 275 | 19.8 | 81.7 |
| Example 1 | P1 | 5 | 275 | 4.72 | 88.9 |
| Example 2 | P1 | 5 | 295 | 4.6 | 89.6 |
| Example 3 | P1 | 10 | 295 | 2.95 | 89.8 |

The results in Table 2 demonstrate that the addition of the sodium ions significantly improves the optical properties of the polyester films comprising FRX Nofia® HM1100. Comparative Examples 2 and 4 and Example 3 were tested for flame retardancy. Surprisingly, only Example 3 achieved an VTM-0 rating despite having similar amounts of flame retardant to Comparative Examples 2 and 4, indicating that the sodium salt was important for both the optical properties as well as the flame retardancy.

Examples 4 to 16

A second series of polyester films based on PET polyesters P1-P7 were made, which in all cases contained 15 wt % of FRX Nofia® HM1100 and having a final film thickness of 50 μm. Examples 5-16 were coated on one side with an acrylic resin adhesion-promoting layer (thickness <0.5 μm). The composition of the films is described in Table 3, along with its properties, measured as described herein.

The results demonstrate that the polyester films of the present invention unexpectedly exhibit excellent flame retardancy, with a VTM-0 rating in the UL94 test method, as well as excellent optical properties of low haze and high total luminous transmission in the visible region.

TABLE 3

| Ex. | Polyester | TLT (%) | Haze (%) | L* | Fire test | | | | | | |
|---|---|---|---|---|---|---|---|---|---|---|---|
| | | | | | A (s) | B (s) | C (s) | D | E | F | Class |
| 4 | P1 | 90.1 | 4.18 | 92.25 | 0.00 | <0.90 | <0.90 | No | No | No | VTM-0 |
| 5 | P1 | 91.8 | 4.07 | 92.19 | 0.00 | <0.90 | <0.90 | No | No | No | VTM-0 |
| 6 | 50% P2 + 50% P1 | 90.6 | 2.54 | 92.34 | 0.00 | <1.10 | <1.10 | No | No | No | VTM-0 |
| 7 | 70% P2 + 30% P1 | 92.3 | 2.22 | 92.29 | 0.00 | <0.90 | <0.90 | No | No | No | VTM-0 |
| 8 | 80% P2 + 20% P1 | 92.4 | 1.30 | 92.33 | 0.00 | ≤1.20 | ≤1.20 | No | No | No | VTM-0 |
| 9 | 90% P2 + 10% P1 | 92.6 | 0.80 | 92.37 | <0.40 | <1.20 | <1.25 | No | No | No | VTM-0 |
| 10 | 85% P2 + 15% P4 | 91.9 | 7.07 | 92.23 | <1.40 | <1.75 | <1.75 | No | No | No | VTM-0 |
| 11 | 90% P2 + 10% P4 | 92.2 | 4.23 | 92.28 | <1.00 | <1.00 | <1.45 | No | No | No | VTM-0 |
| 12 | 95% P2 + 5% P4 | 92.3 | 2.34 | 92.32 | 0.00 | <1.05 | <1.05 | No | No | No | VTM-0 |
| 13 | 80% P2 + 20% P5 | 91.9 | 5.19 | 92.24 | <1.60 | <0.95 | ≤1.40 | No | No | No | VTM-0 |
| 14 | 85% P2 + 15% P5 | 91.9 | 3.88 | 92.27 | ≤0.85 | <1.65 | <2.10 | No | No | No | VTM-0 |
| 15 | 90% P2 + 10% P5 | 92.2 | 2.50 | 92.32 | <1.50 | <1.40 | <2.85 | No | No | No | VTM-0 |
| 16 | 90% P2 + 10% P3 | 92.2 | 3.68 | 92.28 | 0.00 | <1.10 | <1.10 | No | No | No | VTM-0 |

Comparative Example 5 and Examples 17-19

A third series of sodium salt-containing films based on polyester P2 was made, containing varying amounts of FRX Nofia® HM1100 flame retardant, as shown in Table 4.

TABLE 4

| Example | Flame retardant (wt %) | $T_g$ (° C.) | $T_m$ (° C.) | $\Delta H_m$ (J/g) | Crystallinity (%) |
|---|---|---|---|---|---|
| Comp.Ex. 5 | 0 | — | 248.80 | 36.41 | 26.01 |
| Example 17 | 10 | 90.82 | 248.00 | 40.78 | 29.13 |
| Example 18 | 15 | 90.77 | 242.97 | 28.49 | 20.35 |
| Example 19 | 20 | 90.64 | 243.79 | 28.78 | 20.56 |

The results demonstrate that the flame retardant polyester films of the present invention retain commercially useful levels of crystallinity.

The invention claimed is:

1. A polyester film comprising a polymeric phosphonate flame retardant in an amount of from 1 wt % to 25 wt %, by total weight of the film, and further comprising at least one metal cation selected from the group consisting of Group I and Group II metal cations, wherein said metal cations are present in the form of a salt with a counter-anion selected from hydroxide, polyacrylate, hydrogen carbonate, carboxylate, chloride, acetate, formate and nitrate, wherein said polyester is polyethylene terephthalate, wherein the amount of said at least one metal cation is greater than 0 ppm and not more than 500 ppm relative to the amount of polyester, and wherein said phosphonate flame retardant is a phosphonate flame retardant of formula I:

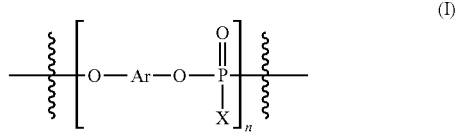

(I)

wherein:
Ar is an aromatic group and —O—Ar—O— is derived from a compound having one or more, optionally substituted, aryl rings;
X is a $C_{1-20}$ alkyl, $C_{2-20}$ alkene, $C_{2-20}$ alkene, $C_{5-20}$ cycloalkyl or $C_{6-20}$ aryl; and
n is an integer from 1 to 100.

2. The polyester film according to claim 1 wherein the polyester film is a biaxially oriented film.

3. The polyester film according to claim 1 wherein the intrinsic viscosity of the film is at least 0.70 dL/g, wherein the intrinsic viscosity is measured by solution viscometry.

4. The polyester film according to claim 1 wherein the polyester film comprises said phosphonate flame retardant in an amount of at least 5 wt % and/or no more than 20 wt % by total weight of the film.

5. The polyester film according to claim 1 wherein X is selected from $C_{1-20}$ alkyl.

6. The polyester film according to claim 1 wherein —O—Ar—O— is derived from bisphenol A, bisphenol F, 4,4'-biphenol, or combinations of these.

7. The polyester film according to claim 1 wherein the phosphonate flame retardant has formula II:

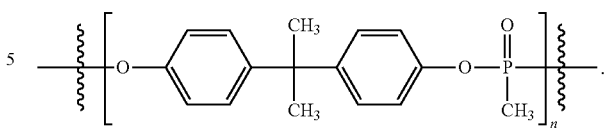

(II)

8. The polyester film according to claim 1 wherein the weight average molecular weight (Mw) of the phosphonate flame retardant is in the range from 10,000 to 120,000 g/mol.

9. The polyester film according to claim 1 wherein the phosphonate flame retardant is characterized by a phosphorus content of at least 5wt %, and/or no more than 20wt % by weight of the phosphonate flame retardant.

10. The polyester film according to claim 1 wherein the glass transition temperature (Tg) of the phosphonate flame retardant is in the range of from 95° C. to 120° C.

11. The polyester film according to claim 1 wherein said metal cations are selected from sodium and potassium.

12. The polyester film according to claim 1 which exhibits a VTM-0 rating in the UL 94 test method.

13. The polyester film according to claim 1 wherein the intrinsic viscosity of the polyester from which the film is manufactured is at least 0.65 dL/g, and not more than 0.85 dL/g, wherein the intrinsic viscosity is measured by solution viscometry.

14. The polyester film according to claim 1, wherein the film thickness is no more than 250 μm, and/or at least 5 μm.

15. The polyester film according to claim 1 which is a clear film wherein the haze of the film is no more than 8% and/or wherein the total light transmission of the film in the visible region is at least 85%.

16. The polyester film according to claim 1 wherein the whiteness index is at least 85 and/or the L* value of the film is at least 90 and/or the transmission optical density of the film is at least 0.5.

17. The polyester film according to claim 1 which is a mono-layer polyester film.

18. The polyester film according to claim 1 wherein the film is coated with an adhesion-promoting layer.

19. The polyester film according to claim 1, wherein the phosphonate flame retardant is at least partially copolymerised with the polyester.

20. The polyester film according to claim 1 which is a semi-crystalline film exhibiting a crystallinity in the range of 20% to 50%.

21. The polyester film according to claim 1 which exhibits a shrinkage of less than 5% at 150° C. over 30 minutes in both the longitudinal and transverse dimensions of the film.

22. The polyester film according to claim 1 which exhibits an Ultimate Tensile Strength (UTS) in each of the longitudinal and transverse directions of the film of at least 15 kg/mm$^2$ and/or an Elongation To Break (ETB) in each of the longitudinal and transverse directions of the film of at least 130%.

23. A method for imparting flame retardancy to or improving the flame retardancy of a polyester film, the method comprising the step of providing in the film a combination of a polymeric phosphonate flame retardant, in an amount of from 1.0 wt % to 25.0 wt % by total weight of the film, and at least one metal cation selected from the group consisting of Group I and Group II metal cations, wherein said metal cations are present in the form of a salt with a counter-anion selected from hydroxide, polyacrylate, hydrogen carbonate, carboxylate, chloride, acetate, formate and nitrate, wherein said polyester is polyethylene terephthalate, wherein the amount of said at least one metal cation is greater than 0 ppm and not more than 500 ppm relative to the amount of polyester, and wherein said phosphonate flame retardant is a phosphonate flame retardant of formula I:

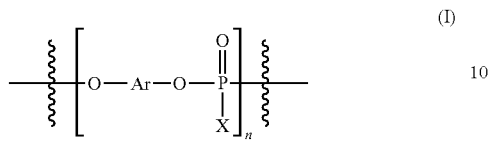

wherein:
Ar is an aromatic group and —O—Ar—O— is derived from a compound having one or more, optionally substituted, aryl rings;
X is a $C_{1-20}$ alkyl, $C_{2-20}$ alkene, $C_{2-20}$ alkene, $C_{5-20}$ cycloalkyl or $C_{6-20}$ aryl; and
n is an integer from 1 to 100.

24. The method according to claim 23 wherein said method to impart flame retardancy to or improve flame retardancy of said polyester film is a method to impart to the polyester film a VTM-0 rating in the UL 94 test method.

* * * * *